(12) United States Patent
Dodrill

(10) Patent No.: US 9,626,882 B2
(45) Date of Patent: Apr. 18, 2017

(54) COLOR-CHANGING SEALANT

(71) Applicant: Doug Dodrill, Addison, IL (US)

(72) Inventor: Doug Dodrill, Addison, IL (US)

( * ) Notice: Subject to any disclaimer, the term of this patent is extended or adjusted under 35 U.S.C. 154(b) by 131 days.

(21) Appl. No.: 14/064,433

(22) Filed: Oct. 28, 2013

(65) Prior Publication Data

US 2014/0120292 A1    May 1, 2014

Related U.S. Application Data

(60) Provisional application No. 61/718,793, filed on Oct. 26, 2012.

(51) Int. Cl.
```
G09F 3/03      (2006.01)
B29D 99/00     (2010.01)
C09J 7/02      (2006.01)
```

(52) U.S. Cl.
CPC ....... *G09F 3/0376* (2013.01); *B29D 99/0053* (2013.01); *C09J 7/0225* (2013.01); *G09F 3/0341* (2013.01); *Y10T 428/1467* (2015.01)

(58) Field of Classification Search
CPC .... G09F 3/0341; G09F 3/0291; G09F 3/0292; G09F 3/0376; G09F 2003/0276; G09F 2003/0277; B29D 99/0053; C09J 7/0225; Y10T 428/1467; Y10T 428/1476; Y10S 428/915; Y10S 428/916

See application file for complete search history.

(56) References Cited

U.S. PATENT DOCUMENTS

| | | | | |
|---|---|---|---|---|
| 3,616,898 A | * | 11/1971 | Massie | B65D 75/30 116/207 |
| 4,194,622 A | * | 3/1980 | Lewis | A61L 2/26 206/363 |
| 4,197,947 A | * | 4/1980 | Zaidi | A61L 2/26 206/438 |
| 4,296,179 A | * | 10/1981 | Wardwell | A61F 15/001 156/701 |
| 4,296,582 A | * | 10/1981 | Simpson | E04C 2/526 52/592.1 |
| 5,469,968 A | * | 11/1995 | Matthews | B65D 75/327 206/484 |
| 5,492,411 A | * | 2/1996 | May | 383/5 |
| 5,882,749 A | | 3/1999 | Jones et al. | |
| 5,997,968 A | | 12/1999 | Dries et al. | |
| 6,428,867 B1 | * | 8/2002 | Scott et al. | 428/40.1 |

(Continued)

OTHER PUBLICATIONS

European Patent Office Search Report, dated Feb. 3, 2016; 8 pages.

*Primary Examiner* — Patricia L Nordmeyer
(74) *Attorney, Agent, or Firm* — Seyfarth Shaw LLP

(57) ABSTRACT

A sealing element that utilizes cohesive peeling to visually indicate when a sealing element has been opened. The peel layer and bulk layer can be coupled together and contain coloring agents which are complementary colors that together make up a secondary color. Alternatively, the peel layer can be coupled to a first bulk layer and the first bulk layer coupled to a second bulk layer. The colors of the coloring agents applied to the peel layer and first bulk layer together do not make up a secondary color, and the colors of the coloring agents of the second bulk layer and the first bulk layer together do not make up a secondary color.

8 Claims, 1 Drawing Sheet

(56) References Cited

U.S. PATENT DOCUMENTS

| | | | |
|---|---|---|---|
| 6,902,817 B2 * | 6/2005 | Bowen | A61L 9/12 428/475.2 |
| 2005/0258634 A1 * | 11/2005 | Dronzek | B32B 27/08 283/72 |
| 2006/0088695 A1 | 4/2006 | Coburn | |
| 2006/0222798 A1 * | 10/2006 | Brandenburg | B32B 3/266 428/35.7 |

* cited by examiner

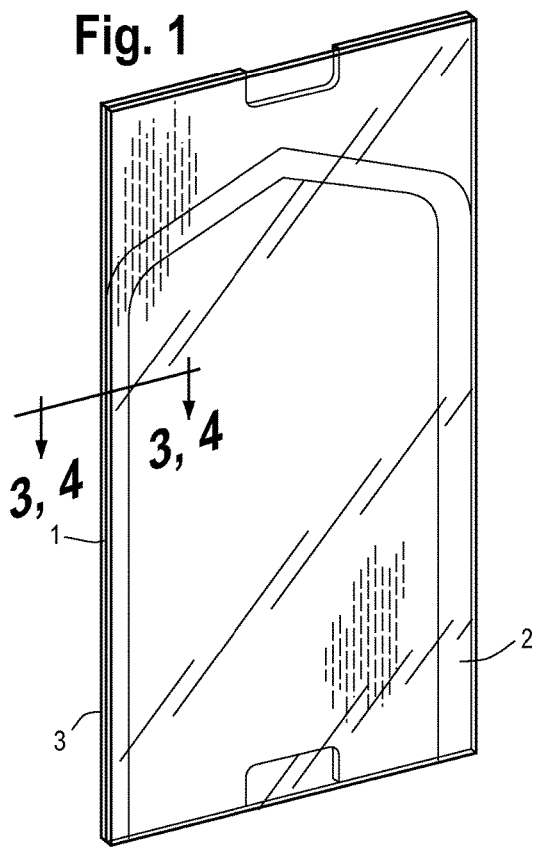
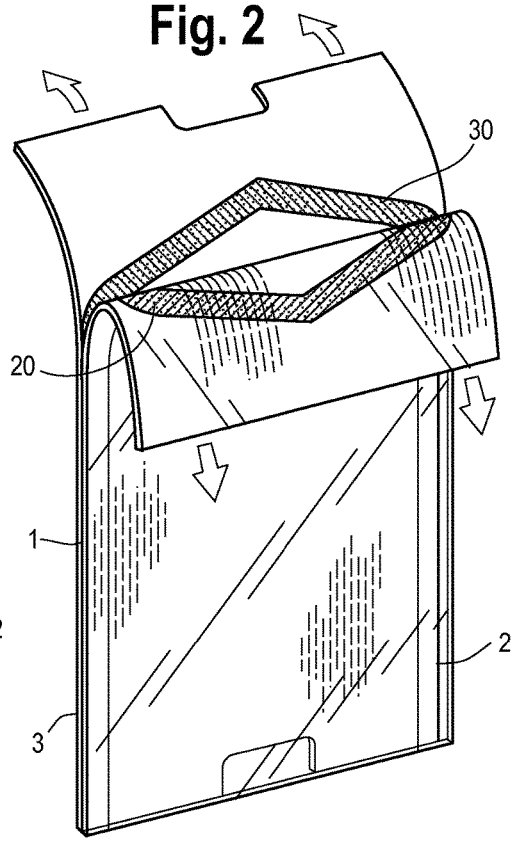
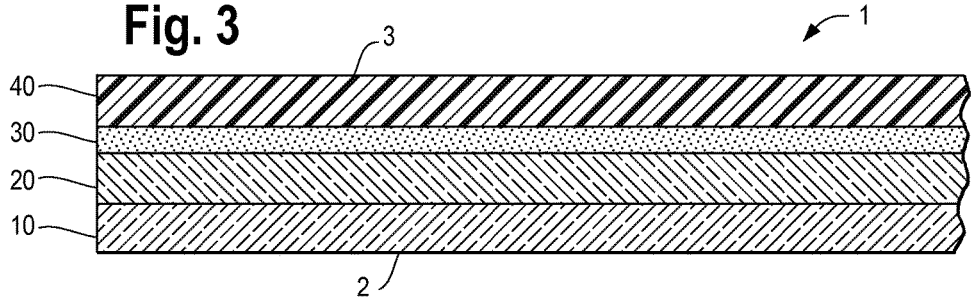
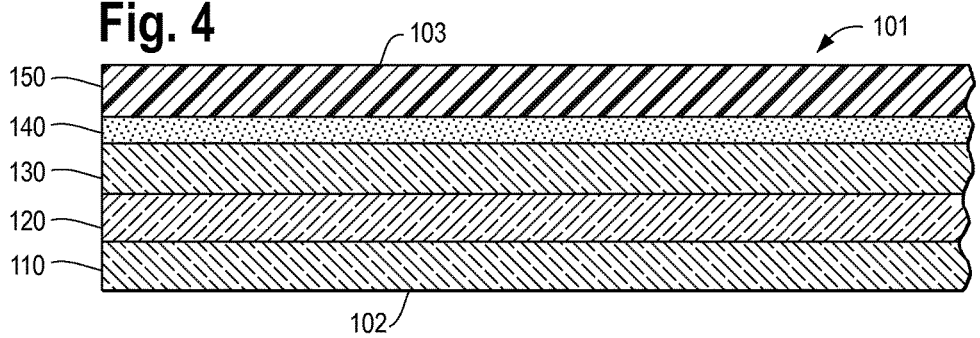

COLOR-CHANGING SEALANT

CROSS-REFERENCE TO RELATED APPLICATIONS

The present application claims priority from U.S. application Ser. No. 61/718,793, filed Oct. 26, 2012, which is incorporated by reference herein in its entirety.

TECHNICAL FIELD OF THE INVENTION

The present application relates to sealant technology, and more particularly to thin film sealing elements.

BACKGROUND OF THE INVENTION

Sealants are found in many different forms. Sealants can be a stand-alone product capable of securing two objects together or can be embedded within a substrate to secure two sides of a package together. For example, many laminated products include a heat seal around one or more edges of the product. The seal is effected by applying heat and/or pressure to multiple films and causing mechanical bonding between two or more of the films.

Sealants are also commonly used in tamper-evident packages. Tamper-evident packages are used in a variety of fields to determine whether a package has been opened or otherwise tampered with. For example, the medical industry uses tamper-evident packaging to show when a sterile package has been opened and exposed to a non-sterile atmosphere, at times compromising the safe use of the contents of the package.

Current tamper-evident packaging does not provide strong visual evidence that the seal has been opened. Conventional medical packaging generally only displays an indicator that does not change the color of the film from which it originated. In the event that the user (such as a doctor, nurse, or other medical professional) is not aware that the seal has been opened, the contents of the package may be used in an unsafe manner.

In addition, the colorless or mono-colored film provides no marketing advantages, and counterfeiters can easily replicate the package due to its visual simplicity.

SUMMARY OF THE INVENTION

The present application discloses a sealing element that visually indicates when the sealing element has been peeled by transferring a contrasting colored peel layer from a first surface of the sealing element to a second surface. For example, the sealing element can include a first side and a second side coupled together by the peel layer. The first side can include two layers of complementary colors (e.g., red and blue) that together make up a secondary color (e.g., purple). The layers of the film are seen collectively so a user sees the film as purple rather than two separate layers of red and blue. The blue layer can couple to the second side of the sealing element as a peel layer and can transfer to the second side through cohesive peeling. Therefore, peeling of the sealing element exposes a blue-colored peel layer, which visually indicates to the user that the sealing element has been peeled apart. The sealing element can be used in tamper-evident packaging to visually indicate when the sealing element has been peeled apart, and the color scheme of the sealing element can be used for branding purposes to effectively market objects used with the sealing element. Security and marketing can be improved while counterfeiting can be reduced. The color-changing behavior provides a positive identifier for product authenticity.

For example, the present application includes a sealing element including a bulk layer having a first coloring agent of a first color, a second film, and a peel layer having a second coloring agent of a second color coupled to the bulk layer and the second film. The peel layer is coupled to the bulk layer and the second film prior to peeling. The peel layer is adapted to cohesively peel upon application of a peeling force such that the peel layer is coupled to the second film in the sealed areas after peeling. The first color of the bulk layer is complementary to the second color of the peel layer such that the first color and the second color collectively form a secondary color.

The present application also includes a sealing element including a first bulk layer having a first coloring agent of a first color, a second bulk layer coupled to the first bulk layer, a second film, and a peel layer having a second coloring agent of a second color coupled to the second bulk layer and the second film, the peel layer adapted to cohesively peel upon application of a peeling force such that the peel layer is coupled to the second bulk layer and the second film prior to peeling, and the peel layer is coupled to the second film after peeling.

In addition, the present application includes a method of manufacturing a sealing element including blending a first coloring agent of a first color with a bulk layer, blending a second coloring agent of a second color with a peel layer, extruding (1) the first coloring agent and the bulk layer, and (2) the second coloring agent and the peel layer, to form a first side of a sealing element having a secondary color formed from the first color and the second color, providing a second film, sealing the bulk layer, peel layer, and second film to achieve the sealing element having a cross section of a bulk layer, peel layer, and second film, respectively.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 1 is a prospective view of the sealing element in a pre-peeled state according to one embodiment of the present application.

FIG. 2 is a prospective view of the sealing element in a partially-peeled state according to one embodiment of the present application.

FIG. 3 is a view in section of layers of one embodiment of the present application taken along line "3,4-3,4" of FIG. 1.

FIG. 4 is a view in section of layers of a second embodiment of the present application taken along line "3,4-3,4" of FIG. 1.

It should be understood that any materials, dimensions and tolerances discussed herein are simple proposals such that one of ordinary skill in the art would be able to modify the proposals within the scope of the present application.

DETAILED DESCRIPTION OF THE EMBODIMENTS

While this invention is susceptible of embodiments in many different forms, there is shown in the drawings, and will herein be described in detail, embodiments of the invention with the understanding that the present disclosure is to be considered as an exemplification of the principles of the invention and is not intended to limit the broad aspect of the invention to embodiments illustrated.

The present application discloses a sealing element that utilizes cohesive peeling to visually indicate when a sealing element has been opened. In one embodiment, the peel layer and bulk layer are connected together and contain coloring agents which are complementary colors that together make up a secondary color. For example, the peel layer can include a yellow dye or pigment and the bulk layer can include a blue dye or pigment so that together the layer appears green prior to peeling, but after peeling, the yellow peel layer transfers to the other side of the sealing element to visually indicate that the sealing element has been opened.

Alternatively, the first side of the sealing element can include any color peel layer that transfers to the second side of the sealing element to visually indicate when the sealing element is opened. For example, the sealing element can include a red-colored peel layer and a yellow colored film on the second side, causing an orange indicator once the seal is opened.

FIGS. 1 and 2 illustrate a package having the sealing element 1 on at least a portion of its peripheral edges, with FIG. 1 illustrating the pre-peeled or closed configuration and FIG. 2 illustrating a partially-peeled or open configuration. FIG. 3 discloses a cross-section of the sealing element 1. The sealing element 1 includes a first side 2 and a second side 3 opposite the first side 2. Prior to peeling, the layers of the sealing element 1 include a first film 10, bulk layer 20, and peel layer 30 on the first side 2, and a second film 40 on the second side 3. The first film 10 and second film 40 can make up the structural backbone of the sealing element 1 on the first side 2 and second side 3, respectively. In an embodiment, the coloring agents of the bulk layer 20 and peel layer 30 together make up the color of the first side 2 visual to the user, preferably as complementary colors that together make up a secondary color.

The first film 10 can be made of any of various materials known in the art, such as polymeric materials. For example, the first film 10 can be made of polyethylene, polyester, nylon, polypropylene, or any of various other polymer materials acting as a structural backbone of a package or sealing element 1. The first film 10 need not be implemented into the sealing element 1, and instead the bulk layer 20 can form the structural backbone of the sealing element 1, for example.

In this embodiment, the bulk layer 20 cooperates with the peel layer 30 to create the visual appearance of a pre-peel color that is visible to a user to indicate that the sealing element has not been peeled apart. After peeling, the bulk layer 20 will remain coupled to the first film 10, while the peel layer 30 will be transferred to the second film 40 by way of cohesive peeling. The bulk layer 20 can be made of any of various materials known in the art, such as low-density polyethylene, linear low density polyethylene, or any other polymer.

The peel layer 30 acts as the visual indicator that the sealing element 1 has been peeled apart. Prior to peeling, the color of the peel layer visually appears as a secondary color based on the combination of the peel layer 30 and bulk layer 20. After peeling, the peel layer 30 is separated from the bulk layer 20 and each reveal their individual colors. For example, in an embodiment, the peel layer 30 can include a coloring agent of a first color, while the bulk layer 20 can include a coloring agent of a second color that is complementary to the coloring agent of the peel layer 30 so as to create a secondary color when the two layers are coupled together. For example, the peel layer 30 can include a yellow dye or pigment while the bulk layer 20 can include a blue dye or pigment, so as to create a green appearance prior to peeling, but the peel layer 30 showing a yellow color on the second film 40 after peeling. The peel layer 30 can be made of any of various materials or combinations of materials, for example, a blend of a base polymer (such as low-density polyethylene) and an incompatible polymer (such as polybutene). The incompatible polymer can weaken the bonds between the polymer chains to allow for easier separation of the peeling component of the sealing component.

The second film 40 is similar to the first film 10 by acting as a structural backbone for the sealing element 1. The second film 40 can also be made of any of various materials and may have multiple layers, polymeric or otherwise, for example, polyethylene, polyester, nylon, polypropylene, or any of various other polymers. In this embodiment the second film 40 may contain a coloring agent that is colored so as to contrast with the coloring agent of the peel layer 30 once the peel layer 30 is transferred on to the second film 40. For example, the second film 40 can include white colored material, whereas the peel layer 30 can include blue colored material. Upon opening of the seal, a blue color on the second film 40 will visually indicate to a user that the sealing element 1 has been peeled apart. Any other color combinations can be used without departing from the spirit and scope of the present application. For example, the second film 40 can be clear.

The embodiment discussed above with respect to FIG. 3 illustrates how a peel layer 30 of one color and a bulk layer 20 of another color can form a secondary color when coupled together, but after being peeled away, can show two complementary colors that indicate to the user that the package has been opened. The above embodiment is not limited to complementary colored peel layers 30 and bulk layers 20, and such layers can include any of various materials of any of various colors. Also, the number and size of layers shown in the figures are merely examples.

FIG. 4 discloses another embodiment of the present application where a second bulk layer can be provided between the peel layer and the first bulk layer and where complementary colors need not be used. For example, as shown, FIG. 4 illustrates a sealing element 101 having a first side 102, a second side 103, a first film 110, a first bulk layer 120, a second bulk layer 130, a peel layer 140, and a second film 150. The first film 110 and second film 150 are similar to the first film 10 and second film 40 of the embodiment discussed above with respect to FIG. 3, wherein the first 110 and second 150 films form the structural backbone of the sealing element 101. Even more so in FIG. 4, the first bulk layer 120 and the peel layer 140 do not need to be complementary colors that form a secondary color. Rather, the peel layer 140 can be separated from the first bulk layer 120 by a second bulk layer 130 that is colored or otherwise colorless so as not to alter the color of the peel layer 140 or the first bulk layer 120. For example, the second bulk layer 130 may be white or black. In another embodiment, the second bulk layer 130 may be opaque. After peeling, the peel layer 140 can still be transferred to the second film 150 by cohesive peeling, but without requiring the first 120 and second 130 bulk layers to be any specific color. The sealing element 101 can therefore be any combination of colors and is not limited, in this embodiment or in the sealing element 1 discussed above with respect to FIG. 3, to having a peel layer and bulk layer of complementary colors.

The first film 110, second film 150, and peel layer 140 can be made of any of various materials, including the same or a different material as the first film 10, second film 40, and peel layer 30, respectively, of FIG. 3. Similarly, the first bulk layer 120 and second bulk layer 130 can be made any of various materials, including the same or a different material as the bulk layer 20 of FIG. 3.

The bulk layer 20 and the second bulk layer 130 can be made of a pressure-sensitive adhesive such that the sealing element 1, 101 can be resealed. In this embodiment, the peel layer 30, 140 can be transferred from the first side 2, 102 to the second side 3, 103 as discussed above to provide a visual indication of tampering. However, after opening, the sealing element 1, 101 can be resealed by simply applying pressure to the sealing element and thereby coupling the pressure-sensitive adhesive of the bulk layer 20 or the second bulk layer 130 with the second film 40, 150, respectively.

As shown in FIGS. 1 and 2, the sealing element 1, 101 may be configured as a solid strip along at least a portion of the peripheral edges of the package. In an embodiment, the attempted resealing of an opened color-changing seal can be visually indicated to the user by incorporating any various designs within the sealing element 1, 101. For example, the sealing element 1, 101 may incorporate a series of small, thin rings or other outlines within the strip of the sealing element where, upon peeling, the peel layer 30 does not transfer to the second film 40 and remains coupled to the bulk layer 20. Accordingly, should a user attempt to reseal the sealing element by recoupling bulk layer 20 with the second film 40, the series of rings must align perfectly in order for the sealing element to appear as though it was not previously opened. Incorporating the design within the sealing element 1, 101 provides a mechanism that allows a user to determine whether the sealing element 1, 101 has been peeled apart and subsequently resealed. It should be appreciated that any number of designs may be incorporated into the sealing element so long as the design does not occupy the full width of the sealing element, thereby destroying the integrity of the seal.

When manufacturing, the bulk layer 20 and peel layer 30 can be coextruded, or can be extruded or manufactured separately and combined together by any of various known means. For example, the bulk layer 20 and peel layer 30 can be combined by means of pressure, temperature, lamination, coating, or coextrusion. In an illustrative embodiment, the bulk layer 20 and peel layer 30 are coextruded, and the seal between the peel layer 30 and the second film 40 is effected through heat sealing, ultrasonic sealing, or impulse sealing. The same applies for the embodiment of FIG. 3.

The above disclosure provides a coloring mechanism that allows a user to determine whether the sealing element 1, 101 has been peeled apart. Accordingly, the sealing element 1, 101 can be used in a tamper-evident package and the contents of the sealing element 1, 101 can remain sterile until opened. Opening of the color-changing seal can be strongly and visually indicated to the user. The sealing element can include any of various colors, such as colors of a particular brand, hospital or any other color combination. Accordingly, branding can be applied to the sealing element 1, 101 and utilized for marketing purposes. In addition, the color-changing mechanism can be used to deter counterfeiting as the effect is difficult to duplicate.

The various films and sealants are discussed above as, in some cases, having a color attribute. While certain of the films or layers are described as having a color attribute it should be appreciated that others of the various layers may incorporate color attributes. Similarly, the films and sealants can be colored by any of various known means, including pigment, dye, or other coloring agent. The coloring agent can be concentrated, compounded, and/or combined into a polymer, and then blended with other resins associated with the films and sealants prior to extrusion. Other means of coloring the films and sealants can be implemented without departing from the spirit and scope of the present application.

The present application discusses color-transfer technology as applied to films. However, the color-transfer mechanism can be applied to any of various structures. For example, the second film 40 can be a cup, tray, flange, rim, board, base, shaft, or other structure. In one embodiment, the second film 40 is a tray that visually indicates when the peel layer 30 has been transferred.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined only in the claims of the nonprovisional application when viewed in their proper perspective based on the prior art.

What is claimed is:

1. A package having opposing first and second sides defining an interior therebetween adapted to be accessible in an open configuration that allows access to the interior, and a closed configuration that substantially prevents access to the interior, the package comprising:
   a first film disposed proximate the first side including:
      a bulk layer having a first coloring agent with a first color; and
      a peel layer coupled to the bulk layer and having a second coloring agent with a second color, wherein the first and second colors are complementary to each other to cooperatively create a third color; and
   a second film disposed proximate the second side and coupled to the peel layer at a seal located on at least part of a periphery of the first and second films, the peel layer is detached from the second film in areas other than the seal,
   wherein the peel layer is coupled to the bulk layer and the second film at the seal to show the third color when in the closed configuration, and the peel layer is coupled to the second film and spaced from the bulk layer at the seal upon application of a peeling force to show the second color when in the open configuration.

2. The package of claim 1, wherein the bulk layer includes a pressure-sensitive adhesive adapted to allow the bulk and peel layers to be releasably recoupled to each other.

3. The package of claim 1, wherein the peel layer includes a base polymer and an incompatible polymer adapted to weaken bonds in the base polymer.

4. The package of claim 1, wherein the seal is configured as a solid strip.

5. The package of claim 1, further comprising a tamper-evident structure adapted to prevent recoupling of the peel layer to the bulk layer after application of the peeling force.

6. A package having opposing first and second sides defining an interior therebetween adapted to be accessible in an open configuration, and a closed configuration that substantially prevents access to the interior, the package comprising:
   a first film disposed proximate the first side including:

a first bulk layer having a first coloring agent with a first color;

a second bulk layer coupled to the first bulk layer; and a peel layer coupled to the second bulk layer and having a second coloring agent with a second color; and a second film disposed proximate the second side and coupled to the peel layer at a seal located on at least part of a periphery of the first and second films, the peel layer is detached from the second film in areas other than the seal, wherein the peel layer is coupled to the second film and the second bulk layer at the seal when in the closed configuration, and the peel layer is coupled to the second film and separated from the second bulk layer at the seal upon application of a peeling force to show the second color when in the open configuration.

7. The package of claim 6, wherein the second bulk layer is composed of a pressure-sensitive adhesive adapted to allow the second bulk layer to recouple to the peel layer after application of the peeling force.

8. The package of claim 6, wherein the peel layer includes a base polymer and an incompatible polymer adapted to weaken bonds in the base polymer.

* * * * *